_United States Patent Office_

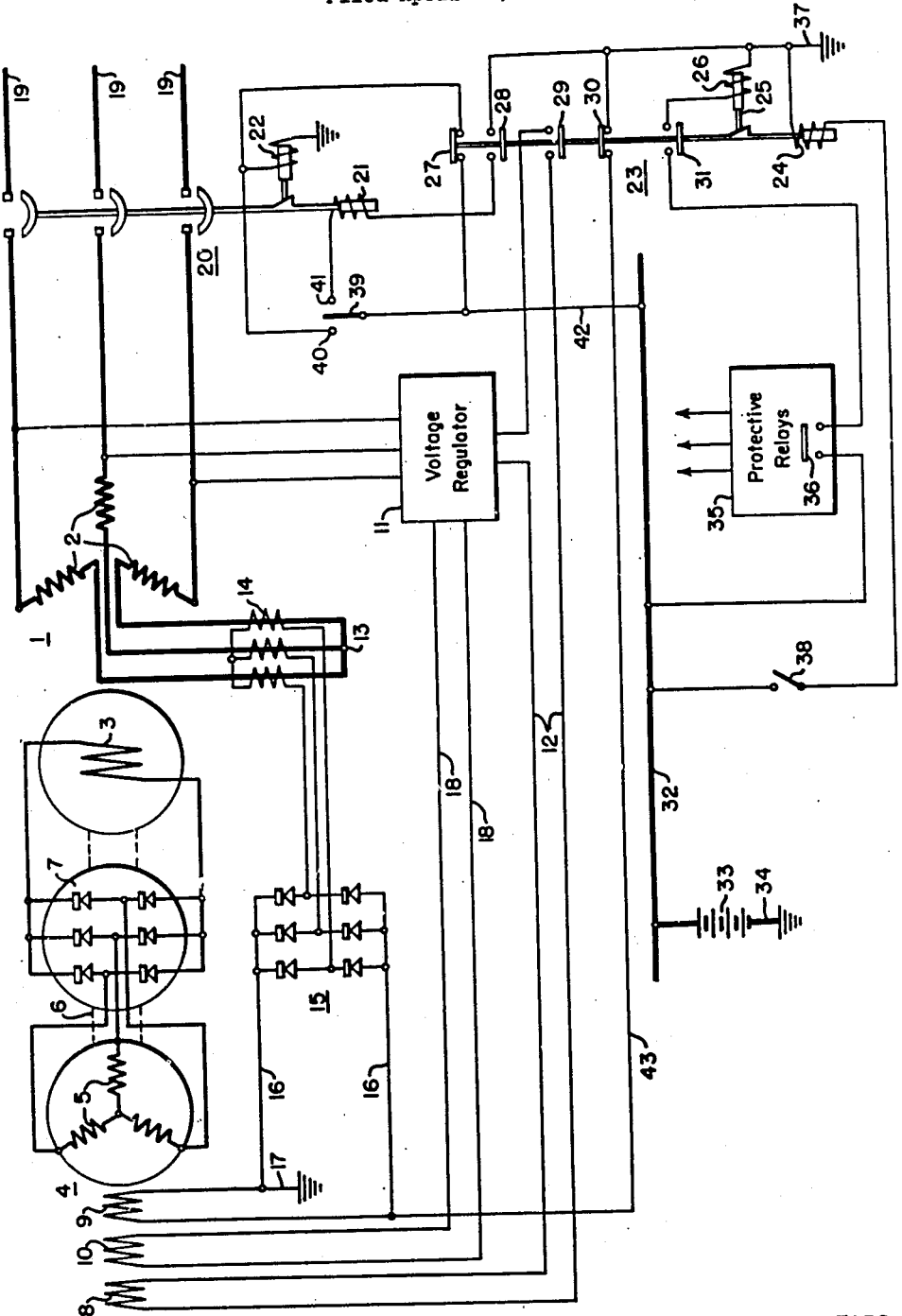

2,858,502
Patented Oct. 28, 1958

2,858,502

GENERATOR CONTROL SYSTEM

Lewis R. Lowry, Jr., and George H. Stearley, Lima, Ohio, assignors to Westinghouse Electric Corporation, East Pittsburgh, Pa., a corporation of Pennsylvania Application April 26, 1956, Serial No. 580,867

4 Claims. (Cl. 322—25)

The present invention relates to the control of alternating current generators and, more particularly, to the control of the excitation circuits of such generators.

While the invention is not necessarily limited in its application to any particular type of generator system, it is especially suitable for use in alternating current aircraft electrical systems. In such systems, the generator is provided with an exciter to supply the necessary direct current field excitation and is connected to a load bus by a circuit breaker, often for operation in parallel with other generators. The generator is controlled by a control relay, or field relay, which controls the operation of the circuit breaker and also controls the exciter field circuit to remove excitation from the generator when the control relay is tripped.

The latter function is often performed by a contact on the control relay which interrupts the circuit of the exciter field winding when the control relay is tripped. In some cases, however, the exciter not only has a main or shunt field winding but also has a compound field winding energized in accordance with the output current of the alternating current generator, so that it functions as a series winding to provide compounding. In such systems, interruption of the main exciter field winding circuit alone is not sufficient, since the compound field winding is excited from the generator output current, and under some fault conditions is sufficiently energized to be self-supporting, so that the generator cannot be de-energized. It is necessary, therefore, to provide for de-energizing the compound field winding as well as the main field winding, but in an aircraft system this cannot be done in the obvious way merely by providing another relay contact to interrupt the compound field winding circuit, since the weight and complication of wiring must be kept to a minimum, and it is not satisfactory to add additional heavy conductors running from the generator to the control relay, which is mounted on a control panel often at a considerable distance from the generator itself.

The principal object of the present invention is to provide a control system for an alternating current generator having an exciter provided with main and compound field windings, in which both exciter field windings are effectively de-energized by operation of a control relay with a minimum of added wiring and weight.

A more specific object of the invention is to provide a control system for an alternating current generator having an exciter provided with main and compound field windings, in which a control relay is provided for control of the generator, and in which the circuit of the main exciter field winding is interrupted by operation of the relay while the compound field winding is simultaneously de-energized by means of a single light wire connecting the exciter and the control relay.

Other objects and advantages of the invention will be apparent from the following detailed description, taken in connection with the accompanying drawing, the single figure of which is a schematic diagram showing an illustrative embodiment of the invention.

The invention is shown in the drawing embodied in a control system for an alternating current generator 1. The generator 1 may be any desired type of alternating current generator provided with an exciter, but is shown for the purpose of illustration as being a generator of the so-called brushless type. The generator 1 may be of any suitable physical construction and has a three-phase armature winding 2 disposed on the stator of the machine. The generator 1 has a field winding 3 on the rotor of the machine. Direct current excitation for the field winding 3 is provided by an exciter 4, which may also be of any suitable physical construction, and which may be built integrally with the generator 1. The exciter 4 is shown as an alternating current machine having a three-phase armature winding 5 on the rotor member which is preferably on the same shaft as the generator rotor, as indicated at 6. The alternating current output of the exciter armature winding 5 is applied to a three-phase rotating rectifier 7, which is also mounted on the same shaft, and the direct current output of the rectifier 7 is applied to the generator field winding 3. In this way, a generator is provided which requires no sliding contacts and has no commutator, slip rings or brushes.

The direct current field windings of the exciter 4 are disposed on the stator of the exciter. In the illustrated embodiment, the exciter 4 has a main or shunt field winding 8, a compound or series field winding 9, and a stabilizing winding 10. The main field winding 8 may be supplied with direct current excitation in any suitable manner under the control of a voltage regulator 11. The voltage regulator may be of any suitable type and has not been shown in detail since it is not a part of the invention. The regulator 11, however, is preferably a static type of regulator utilizing magnetic amplifiers, and is shown as being connected to the output leads of the generator 1 to derive the excitation energy from the generator. It will be understood that the output of the voltage regulator 11, which is connected to the main exciter field winding 8 by leads 12, is a direct current output which is varied as required to maintain constant generator output voltage.

The exciter compound field winding 9 is excited in accordance with the output current of the generator 1. For this purpose, the neutral leads of the generator winding 2 are brought out of the machine to a neutral point 13, and current transformers 14 are connected in the neutral leads so that their secondary output is proportional to the generator load current. The current transformers 14 are connected to a three-phase rectifier 15, and the direct current output of the rectifier 15 is connected to the compound field winding 9 by conductors 16. Thus, the compound field winding 9 is excited in accordance with the generator output current and acts as a series field winding to provide compounding. One side of the compound field winding 9, shown as the positive side, is connected to ground as indicated at 17.

The stabilizing winding 10 is provided to improve the stability of the system by preventing excessive transient overshoot and recovery time of the generator voltage under sudden changes in load. This winding is of the type disclosed and claimed in a copending application of A. A. Lighty, Serial No. 473,290, filed December 6, 1954. As more fully disclosed and claimed in that application, the stabilizing winding 10 is wound on the magnetic circuit of the exciter field structure in inductive relation with the main exciter field winding 8, so that when the excitation of the main field winding changes, a voltage is induced in the stabilizing winding 10 proportional to the rate of change of the main field winding excitation, and the voltage thus produced provides a stabilizing signal which is applied to the voltage regulator 11 through conductors 18.

The generator 1 is connected to a three-phase load bus 19 by means of a circuit breaker 20 which has a closing coil 21 and a trip coil 22. The circuit breaker 20 and the excitation circuits of the generator 1 are controlled by a generator control relay 23. The relay 23 is shown as a latch type relay having a closing coil 24 which actuates the relay to closed position when energized, and a latching mechanism 25 of any suitable type which latches the relay in the closed position. A trip coil 26 is provided to release the latch 25 to permit the relay to return to the open or tripped position. The control relay 23 has a normally closed contact 27 connected to the trip coil 22 of the circuit breaker 20, and a normally open contact 28 connected to the closing coil 21 of the circuit breaker 20. The relay 23 also has a normally open contact 29 and a normally closed contact 30, which are utilized to control the excitation circuits, and has a normally open contact 31 in series with the relay trip coil 26. The relay contact 29 is connected in series with the main exciter field winding 8 to interrupt the circuit of the field winding when the relay is in the tripper position. The contact 30 is utilized to control the compound exciter field winding 9 as described hereinafter.

The circuit breaker 20 and control relay 23 are preferably designed for direct current energization, and their closing and trip coils are shown as being energized from a direct current bus 32, which may be supplied with direct current from any suitable source, shown diagrammatically as a battery 33 having one terminal connected to the bus 32 and the other terminal connected to ground at 34.

The complete generator control system also includes suitable protective relays, indicated at 35. The protective relaying system itself is not a part of the present invention, and the relays have been indicated diagrammatically to avoid unnecessary complication of the drawing. It will be understood that protection must be provided against various types of faults and other abnormal conditions such as internal faults in the generator 1, faults on the feeders between the generator and the circuit breaker 20, overvoltage or over-excitation of the generator 1, and possibly other conditions. Any suitable type of relay means may be provided for this purpose, one suitable arrangement of relays being shown, for example, in a copending application of B. O. Austin et al., Serial No. 451,019, filed August 19, 1954, now Patent No. 2,821,667, issued January 28, 1958. Whatever type of relay system may be used, however, it is arranged to close a contact or contacts, shown at 36, upon the occurrence of a fault, to connect the relay trip coil 26 to the direct current bus 32, the other end of the trip coil 26 being connected to ground at 37. Manual control of the system is provided by a reset switch 38 connected between the direct current bus 32 and the relay closing coil 24, and by a generator switch 39 having a contact 40 connected to the circuit breaker trip coil 22 and a contact 41 connected to the circuit breaker closing coil 21. The switch 39 is connected to the direct current bus 32 by a conductor 42.

As previously explained, it is desired to remove field excitation from the generator 1 when the control relay 23 is tripped by the protective relays. This cannot be done merely by interrupting the circuit of the exciter main field winding 8 by means of the relay contact 29, since the compound field winding 9 is energized from the generator output current, and under some conditions, such as a fault on the feeders between the generator and the circuit breaker, the field winding 9 would be sufficiently energized to be self-supporting, so that the generator 1 could not be de-energized. In an aircraft system, for which the present invention is particularly intended, it is not permissible to provide for interrupting the circuit of the field winding 9 in the same manner as that of the winding 8, because this would involve running two additional heavy conductors from the exciter to the control relay 23, which is normally mounted on a control panel at a considerable distance from the exciter. In accordance with the present invention, the exciter field winding 9 is de-energized by means of a single conductor 43 which does not normally carry current and which can, therefore, be an extremely small size wire of very light weight. This conductor 43 extends from the ungrounded side of the compound field winding 9 to the contact 30 of the control relay 23, which connects it to ground at 37 when the relay is in the tripped position shown in the drawing, thus short-circuiting the field winding 9 to effectively de-energize it.

The operation of this control system may be briefly described as follows. The system is shown in the drawing in its de-energized condition. When it is desired to start the generator 1 and bring it up to voltage, the control relay 23 is actuated to its closed position by momentarily closing the manual reset switch 38 which completes an energizing circuit to the closing coil 24 of the relay. The relay 23 is thus actuated to its closed position and latched there by the latching mechanism 25. In this position, the relay contact 28 closes to partially complete a circuit for the closing coil 21 of the circuit breaker 20, and the contact 29 closes to complete the circuit of the exciter main field winding 8. At the same time, the contact 30 opens to remove the short circuit from the compound field winding 9. The exciter 4 can then build up its voltage and supply excitation to the generator field 3, and as the generator is brought up to speed, its voltage comes up to the normal value under control of the voltage regulator 11. When it is desired to connect the generator to the load bus 19, the manual generator switch 39 is placed momentarily on the contact 41 which completes the energizing circuit of the breaker closing coil 21, so that the breaker closes to connect the generator to the bus 19.

The system is now in its normal operating condition. If it is desired to remove the generator 1 from the bus without de-energizing it, the manual switch 39 may be placed on the contact 40 which completes a circuit from the direct current bus 32 to the trip coil 22 to trip the breaker. The breaker 20 may thus be tripped and reclosed at will by means of the generator switch 39.

If a fault condition occurs during normal operation of the system, the protective relays operate to close the contact 36. This completes a circuit through the closed contact 31 to the trip coil 26 of the relay 23, so that the relay 23 is tripped and returns to the position shown in the drawing. When this occurs, the contact 27 closes to complete a circuit to the trip coil 22 of the breaker 20 so that the breaker is tripped to disconnect the generator 1 from the bus 19. At the same time, the relay contact 29 opens to interrupt the main exciter field winding circuit, and the contact 30 closes to connect one side of the compound field winding 9 to ground. Since the other side of the compound field winding is permanently grounded at 17, this short circuits the field winding 9, thus effectively de-energizing it. In this way the generator is removed from the bus and field excitation is removed from it by de-energizing the exciter field windings. Short circuiting the compound field winding 9 does not damage or overload the rectifier 15, because as soon as the field winding 9 is short-circuited, the excitation of the generator 1 is removed and its output collapses to substantially zero, so that the output of the current transformers 14 also vanishes and the rectifiers are not injured.

It will now be apparent that a control system has been provided which effectively de-energizes the generator field whenever the control relay 23 is tripped, and that this is accomplished in a system having an exciter compound field winding, with a minimum of added weight and wiring. This result is attained by the use of the conductor 43 extending from the exciter field winding 9 to the control relay, and this conductor may be a small wire of very light weight, since it normally carries no current and carries only a momentary short circuit current when the contact 30 closes. This arrangement has the added advantage that the contact 30 may be a very light contact, since it is not required to interrupt any current but only closes the short circuit of the field winding 9, so that it carries only a momentary short circuit current which rapidly decays to substantially zero. The system has the further advantage that short-circuiting and de-energization of the compound field winding 9 is accomplished by a completely separate circuit, so that the three field windings 8, 9 and 10 are kept completely isolated from each other, thus eliminating any possibility of circulating currents between the different windings, and the possible introduction of erroneous signals into the voltage regulator circuit which might cause system instability.

It will be seen, therefore, that a very effective system is provided for de-energizing an alternating current generator upon tripping of an external control relay, and that this result is accomplished in a very simple manner with a minimum of additional complication and weight over that of conventional systems. A specific embodiment of the invention has been shown for the purpose of illustration, but it will be apparent that the invention is not limited to the specific embodiment shown. Thus, for example, the invention is not limited to the particular type of generator excitation system disclosed, but may be applied to any type of exciter. Similarly, although the invention has been described with particular reference to an aircraft system, it will be obvious that its usefulness is not necessarily limited to this specific application, and that it may be used generally in any type of generating system.

We claim as our invention:

1. In combination, an alternating current generator, an exciter for supplying field excitation to said generator, the exciter having direct current field windings including a main field winding and a compound field winding, switch means for connecting the generator to a load bus, and relay means for controlling the switch means, said relay means including means for interrupting the circuit of said exciter main field winding and for short-circuiting said exciter compound field winding.

2. In combination, an alternating current generator, an exciter for supplying field excitation to said generator, the exciter having direct current field windings including a main field winding and a compound field winding, one side of the compound field winding being connected to ground, switch means for connecting the generator to a load bus, and relay means for controlling the switch means, said relay means including means for interrupting the circuit of said exciter main field winding and for connecting the other side of said exciter compound field winding to ground.

3. In combination, an alternating current generator, an exciter for supplying field excitation to said generator, the exciter having direct current field windings including a main field winding and a compound field winding, transformer means energized by the output current of the generator, rectifier means connected to rectify the output of the transformer means to supply direct current energization to the exciter compound field winding, and control means for the generator including means for interrupting the circuit of said exciter main field winding and for short-circuiting said exciter compound field winding.

4. In combination, an alternating current generator, an exciter for supplying field excitation to said generator, the exciter having direct current field windings including a main field winding and a compound field winding, transformer means energized by the output current of the generator, rectifier means connected to rectify the output of the transformer means to supply direct current energization to the exciter compound field winding, switch means for connecting the generator to a load bus, and relay means for controlling the switch means, said relay means including means for interrupting the circuit of said exciter main field winding and for short-circuiting said exciter compound field winding.

References Cited in the file of this patent

UNITED STATES PATENTS

| | | |
|---|---|---|
| 2,090,524 | Bang | Aug. 17, 1937 |
| 2,332,942 | Shobert | Oct. 26, 1943 |
| 2,426,005 | Exner | Aug. 19, 1947 |
| 2,484,247 | Ratz | Oct. 11, 1949 |